United States Patent
Piccolella

(10) Patent No.: US 10,897,966 B1
(45) Date of Patent: Jan. 26, 2021

(54) ELECTRONIC DRIVERS LICENSE AND ID-BRACELET THAT STORES ESSENTIAL PERSONAL INFORMATION

(71) Applicant: Emilia Dimitrova Piccolella, Las Vegas, NV (US)

(72) Inventor: Emilia Dimitrova Piccolella, Las Vegas, NV (US)

( * ) Notice: Subject to any disclaimer, the term of this patent is extended or adjusted under 35 U.S.C. 154(b) by 0 days.

(21) Appl. No.: 17/000,080

(22) Filed: Aug. 21, 2020

Related U.S. Application Data

(63) Continuation of application No. 16/408,707, filed on May 10, 2019, now Pat. No. 10,791,805.

(60) Provisional application No. 62/679,272, filed on Jun. 1, 2018.

(51) Int. Cl.
| | |
|---|---|
| *G06Q 99/00* | (2006.01) |
| *A44C 5/00* | (2006.01) |
| *G06Q 50/26* | (2012.01) |
| *G06F 1/16* | (2006.01) |
| *G09F 3/00* | (2006.01) |

(52) U.S. Cl.
CPC ............ *A44C 5/0015* (2013.01); *G06F 1/163* (2013.01); *G06Q 50/265* (2013.01); *G09F 3/00* (2013.01)

(58) Field of Classification Search
USPC .......................................... 705/325
See application file for complete search history.

(56) References Cited

U.S. PATENT DOCUMENTS

| | | | |
|---|---|---|---|
| 2016/0012465 A1* | 1/2016 | Sharp | G06Q 20/384 705/14.17 |
| 2019/0391720 A1* | 12/2019 | Choi | G06F 1/163 |

* cited by examiner

*Primary Examiner* — Andargie M Aychillhum
(74) *Attorney, Agent, or Firm* — Plager Schack LLP; Mark H. Plager; Stephen Hallberg

(57) ABSTRACT

An electronic driver's license and ID bracelet that stores essential user information is disclosed. The electronic driver's license and ID bracelet stores user information that government(s) need to know, such as date of birth, driver's permit status, etc. The ID bracelet cannot be duplicated or altered within the civilian or private sector as is the case with contemporary personal identification, therefore the ID bracelet would be for government proprietary use.

7 Claims, 5 Drawing Sheets

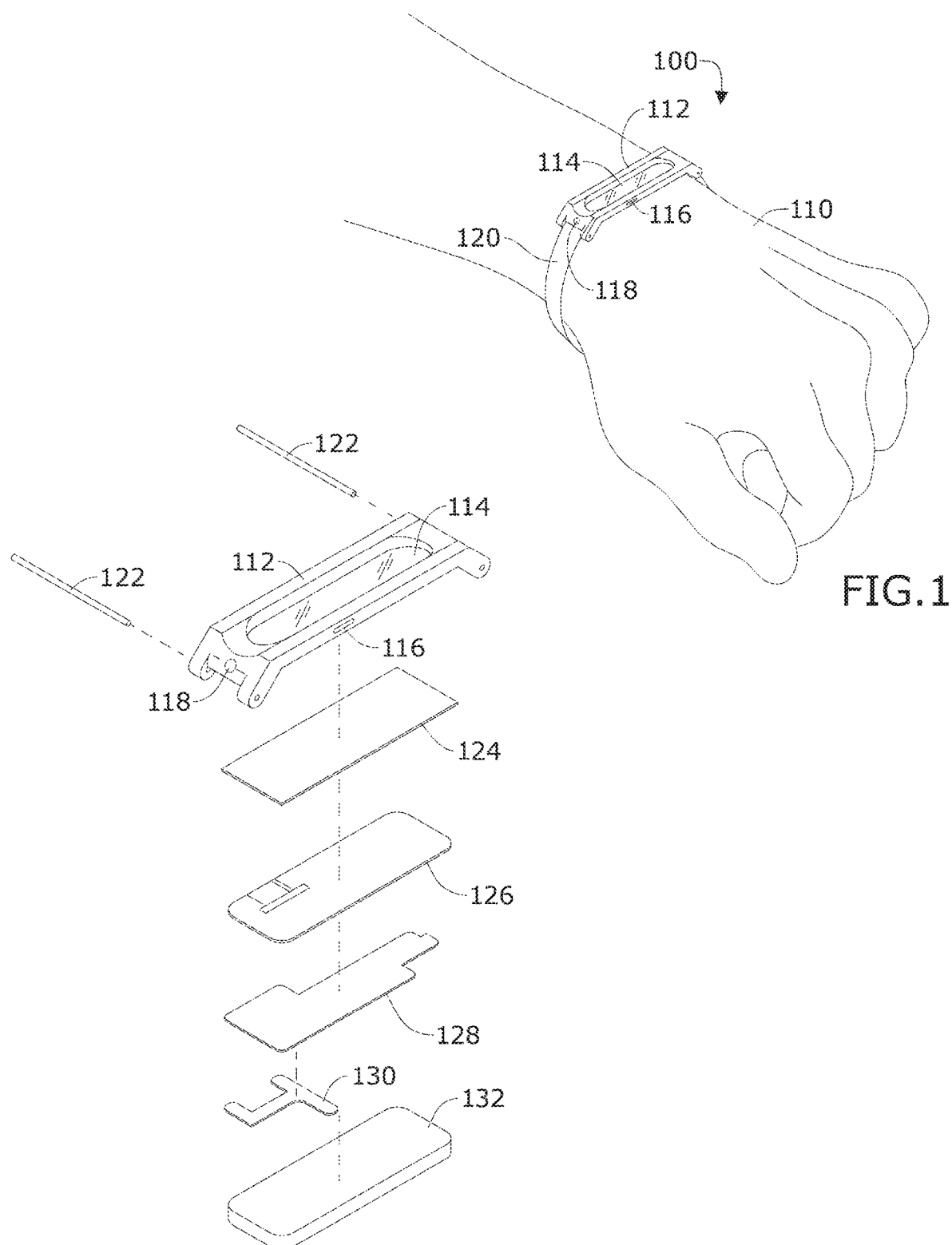

ELECTRONIC DRIVERS LICENSE AND ID-BRACELET THAT STORES ESSENTIAL PERSONAL INFORMATION

CLAIM OF BENEFIT TO PRIOR APPLICATION

This application is a continuation of and claims benefit to U.S. Non-Provisional patent application Ser. No. 16/408,707, entitled "ELECTRONIC DRIVER'S LICENSE AND ID-BRACELET THAT STORES ESSENTIAL PERSONAL INFORMATION," filed May 10, 2019. The U.S. Non-Provisional patent application Ser. No. 16/408,707 is incorporated herein by reference.

BACKGROUND

Embodiments of the invention described in this specification relate generally to identification and user information devices, and more particularly, to an electronic driver's license and ID bracelet that stores essential user information which government entities need to know.

The problem with conventional person identification items is that the contemporary personal identification items are commonly lost, misplaced, left behind, stolen, or altered. For instance, the very common situation of the loss of conventional personal identification (driver's license, ID, or passport) or not having such personal identification readily accessible causes a great amount of trouble and difficulty in carrying out routine daily actions, such as driving a car, going to an adult-only club, etc.

In view of the foregoing, there is a need for an ID bracelet with electronic driver's license and other essential user information, which cannot be duplicated or altered within the civilian or private sector as is the case with contemporary personal identification, but would be suitable for government proprietary use by a secure scanning device that can retrieve the driver's license and other essential user information about a person associated with (and wearing) the ID bracelet.

BRIEF DESCRIPTION

A novel electronic driver's license and ID bracelet is disclosed that stores essential user information that is protected to prevent duplication and alteration of the user information without authorization, and is therefore suitable for government proprietary use. In some embodiments, the electronic driver's license and ID bracelet stores user information that government(s) need to know including at least a date of birth. Examples of user information stored by the electronic driver's license and ID bracelet include, without limitation, date of birth, driver's permit status, etc. When the electronic driver's license and ID bracelet is used to store essential user information that is used by a government, the user information cannot be duplicated or altered within the civilian or private sector, as is the case with contemporary personal identification, therefore the ID bracelet would be for government proprietary use. In some embodiments, information stored on an electronic driver's license and ID bracelet is retrievable by a secure scanning device.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein:

FIG. 1 conceptually illustrates a perspective view of an electronic ID bracelet in some embodiments.

FIG. 2 conceptually illustrates an exploded view of the electronic ID bracelet in some embodiments.

DETAILED DESCRIPTION

Figure 3:
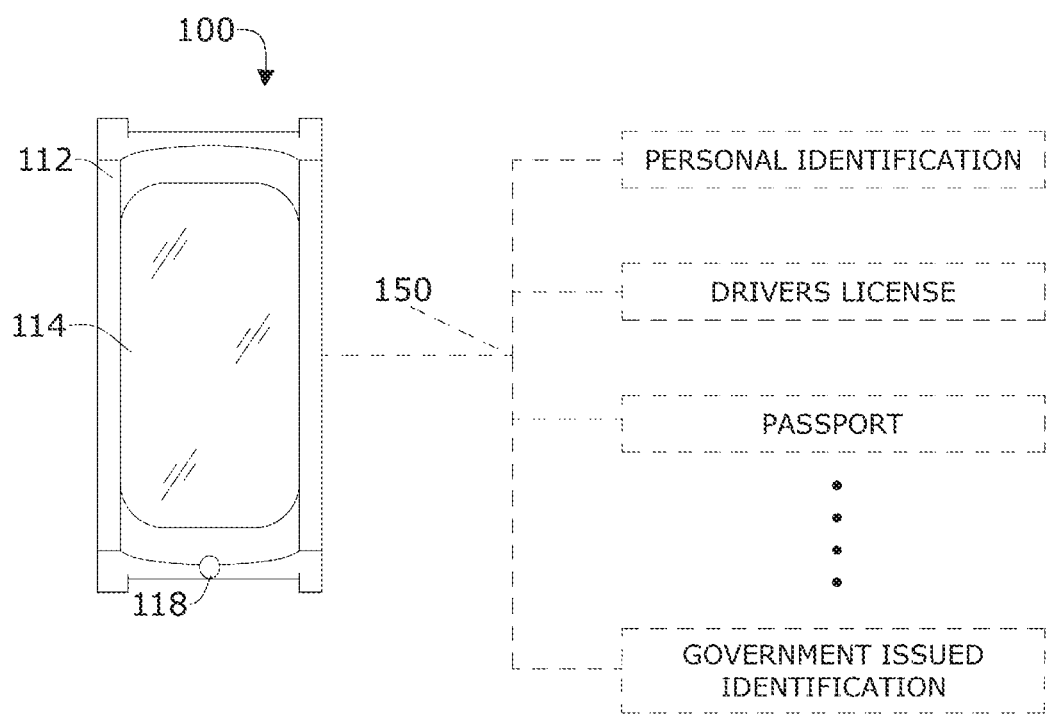
FIG. 3 conceptually illustrates a schematic view of the electronic ID bracelet in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the invention include a novel electronic driver's license and ID bracelet that stores essential user information that is protected to prevent duplication and alteration of the user information without authorization, and is therefore suitable for government proprietary use. In some embodiments, the electronic driver's license and ID bracelet stores user information that government(s) need to know including at least a date of birth. Examples of user information stored by the electronic driver's license and ID bracelet include, without limitation, date of birth, driver's permit status, etc. When the electronic driver's license and ID bracelet is used to store essential user information that is used by a government, the user information cannot be duplicated or altered within the civilian or private sector, as is the case with contemporary personal identification, therefore the ID bracelet would be for government proprietary use. In some embodiments, information stored on an electronic driver's license and ID bracelet is retrievable by a secure scanning device.

As stated above, the problem with conventional person identification items is that the contemporary personal identification items are commonly lost, misplaced, left behind, stolen, or altered. For instance, the very common situation of the loss of conventional personal identification (driver's license, ID, or passport) or not having such personal identification readily accessible causes a great amount of trouble and difficulty in carrying out routine daily actions, such as driving a car, going to an adult-only club, etc. Embodiments of the electronic driver's license and ID bracelet described in this specification solve such problems by providing conventional personal identification information (driver's license, ID, or passport) accessible when the conventional personal identification has been either lost or stolen, but in a secure way that is not able to be duplicated or altered.

Embodiments of the electronic driver's license and ID bracelet described in this specification differ from and improve upon currently existing options. In particular, some embodiments differ from contemporary personal identification on the simple basis that the ID bracelet has personal information and is readily retrievable and scalable, which is not the case with contemporary personal identification when lost or stolen.

In addition, some embodiments of the electronic driver's license and ID bracelet improve upon the currently existing contemporary personal identification in which common wear and tear and intentional altering happen routinely, resulting in a less secure and insufficient identification. In contrast, the ID bracelet cannot be duplicated or altered within the civilian or private sector as is the case with contemporary personal identification, therefore the ID bracelet would be for government proprietary use.

The electronic driver's license and ID bracelet of the present disclosure may be comprised of the following elements. This list of possible constituent elements is intended to be exemplary only and it is not intended that this list be used to limit the electronic driver's license and ID bracelet of the present application to just these elements. Persons having ordinary skill in the art relevant to the present disclosure may understand there to be equivalent elements that may be substituted within the present disclosure without changing the essential function or operation of the electronic driver's license and ID bracelet.

1. Wristband
2. Bezel
3. Electronic device (motherboard, Li battery source, processor, memory, LCD or OLED screen, and infrared transmitter and receiver)
4. Waterproof gasket or O-ring The various elements of the electronic driver's license and ID bracelet of the present disclosure may be related in the following exemplary fashion. It is not intended to limit the scope or nature of the relationships between the various elements and the following examples are presented as illustrative examples only. In some embodiments, the wristband is attached to the bezel. In some embodiments, the bezel provides a chassis for the motherboard with processor (the circuit of which includes lithium ion battery source, processor and LCD screen and infrared transmitter and receiver), which are collectively sealed by the waterproof gasket or O-ring. In some embodiments, the electronic driver's license and ID bracelet further includes a universal serial bus (USB) port. In some embodiments, the LCD screen comprises an LCD touchscreen that is protected by a touchscreen protective glass.

By way of example, FIG. 1 conceptually illustrates a perspective view of an electronic ID bracelet 100 in some embodiments. As shown in this figure, the electronic ID bracelet 100 is worn by a user 110 and includes an outer bezel 112, a touchscreen protective glass 114, a USB port 116, a home button 118, and a bracelet strap 120 that clasps together when wrapped around a wrist of the user.

The electronic driver's license and ID bracelet of the present disclosure generally works when the wristband is attached to the bezel, in which the bezel provides a chassis for the motherboard (circuit includes lithium ion battery source, processor and LCD screen and infrared transmitter and receiver), which are collectively sealed by the waterproof gasket or O-ring.

To use the electronic driver's license and ID bracelet of the present disclosure, the ID bracelet would just need to be placed on the wrist when contemporary personal identification has been the lost, stolen, or altered. Therefore the ID bracelet can be used as a primary use only.

To make the electronic driver's license and ID bracelet of the present disclosure, one may attach a band to a bezel, in which the bezel chassis the motherboard (circuit includes Li battery source, processor, memory, LCD screen, and infrared transmitter and receiver). Then seal it off with the waterproof gasket or O-ring.

Turning to another view, FIG. 2 conceptually illustrates an exploded view of the electronic ID bracelet 100 of some embodiments. The exploded view of the electronic ID bracelet 100 demonstrates how several components of the electronic ID bracelet 100 are internally assembled. As shown in this figure, the electronic ID bracelet 100 includes the outer bezel 112, the touchscreen protective glass 114, the USB port 116, and the home button 118, as described above, as well as wrist strap holding pins 122 that secure opposing ends of the bracelet strap 120 to the outer bezel 112, an LCD display module 124, an NFC antenna 126, a motherboard 128, a Bluetooth/WLAN antenna 130 (radio hardware), and a power source, namely, a lithium ion battery 132.

While the exploded view of the electronic ID bracelet 100 described above by reference to FIG. 2 demonstrates how several internal components fit together within the electronic ID bracelet 100, FIG. 3 conceptually illustrates a schematic view of the electronic ID bracelet 100 of some embodiments. Specifically, the schematic view of the electronic ID bracelet 100 shown in this figure illustrates several of the components that are visible from an exterior top-down view, including the outer bezel 112, the touchscreen protective glass 114, and the home button 118. In addition, the schematic view of the electronic ID bracelet 100 shown in this example demonstrates exemplary user information 150. The user information 150 is the essential user information described above and is stored in a storage module, such as a flash memory module or another persistent storage unit, of the electronic ID bracelet 100. Specifically, the essential user information 150 stored by the electronic ID bracelet 100 includes "PERSONAL IDENTIFICATION", "DRIVER'S LICENSE", "PASSPORT", and "GOVERNMENT ISSUED IDENTIFICATION", possibly among other information of the user stored on the electronic ID bracelet 100 (persistently stored, e.g., in the flash memory module or in another persistent storage unit). In some embodiments, the user information 150 is stored on the flash memory module or other persistent storage unit in encrypted form. Specifically, to ensure that the user information 150 cannot be duplicated or copied, some embodiments of the electronic ID bracelet 100 encrypt the user information for internal storage by way of an encryption protocol program (or code) that implements a highly secure encryption standard. Examples of highly secure encryption standards include, without limitation, SHA256, SHA512, SHA-3, etc.

Figure 4:
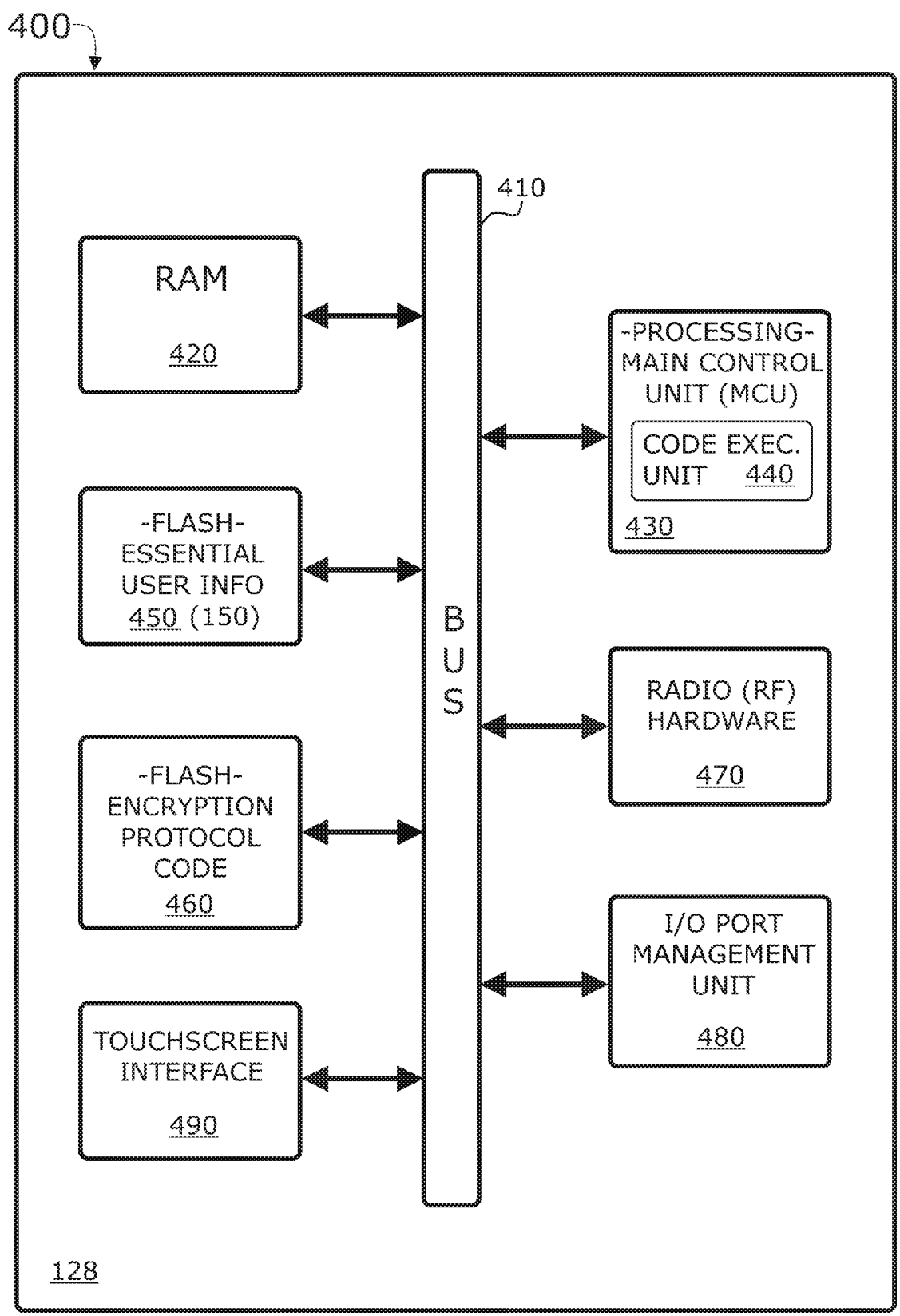
FIG. 4 conceptually illustrates a block diagram of an electronic ID system device in some embodiments.

By way of example, FIG. 4 conceptually illustrates a block diagram of an electronic ID system device 400. As shown in this figure, the electronic ID system device 400 includes a motherboard, such as the motherboard 128 described above by reference to FIG. 2, a bus 410, a random access memory (RAM) 420, a main control unit (MCU) 430 for runtime processing of the electronic ID bracelet 100, a code execution unit 440 embedded within the MCU 430, a first persistent flash memory 450 that stores encrypted essential user information 150, a second persistent flash memory 460 that stores encryption protocol code that is executed by code execution unit 440 of the MCU 430 to encrypt essential user information that is stored in the first persistent flash memory 450 and decrypt essential user information that is retrieved from the first persistent flash memory 450 and visually output to the LCD display module 124 of the electronic ID bracelet 100, radio (RF) hardware 470 to transmit and receive wireless radio signals via NFC antenna 126 and the Bluetooth/WLAN antenna 130, an input/output (I/O) management unit 480, and a touchscreen interface 490.

As noted above, the information that is stored on an electronic driver's license and ID bracelet is retrievable by a secure scanning device of some embodiments. In some embodiments, the secure scanning device includes a chassis, a strap clip, a touchscreen, a scan button, a return button, and a power button.

Figure 5:
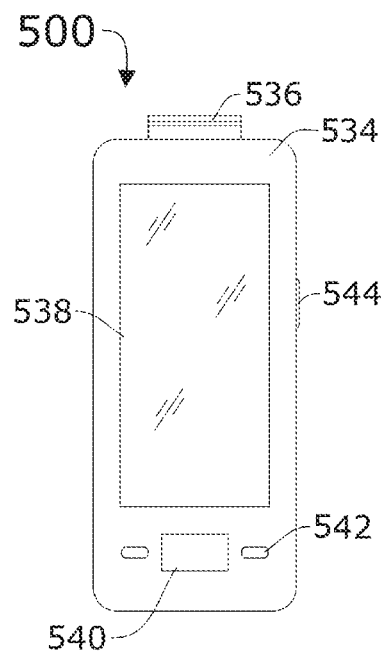
FIG. 5 conceptually illustrates a secure scanning device in some embodiments that is able to retrieve information stored on an electronic driver's license and ID bracelet.

By way of example, FIG. 5 conceptually illustrates a secure scanning device 500 in some embodiments that is able to retrieve information stored on an electronic driver's license and ID bracelet, such as the electronic ID bracelet 100. As shown in this figure, the secure scanning device 500 includes a chassis 534, a strap clip 536, a touchscreen 538, a scan button 540, a return button 542, and a power button 544. In some embodiments, the scan button 540 can be activated to scan information on an electronic driver's license and ID bracelet, such as the electronic ID bracelet 100. The scan button 540 shown in this figure, therefore, can be activated by pressing it down by a user when a person's electronic driver's license and ID bracelet is positioned in a field of view of a camera (not shown) of the secure scanning device 500.

Figure 6:
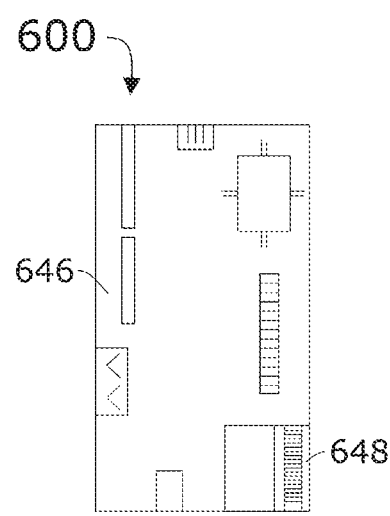
FIG. 6 conceptually illustrates a motherboard of a secure scanning device in some embodiments.

Now turning to another example, FIG. 6 conceptually illustrates a motherboard 600 of the secure scanning device 500 with some of the internal electronic components that allow scanning and communication. Specifically, as shown in this figure, the motherboard 600 includes a printed circuit board (PCB) 646 for the motherboard and a Bluetooth/WLAN antenna 648. These components are only exemplary and not intended as limiting embodiments of the invention described herein. Further details of implementations on devices to scan the essential user information stored on an electronic driver's license and ID bracelet depend on particular details of the applications or applicable usage intended for either or both of the electronic driver's license and ID bracelet and the secure scanning device.

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 7:
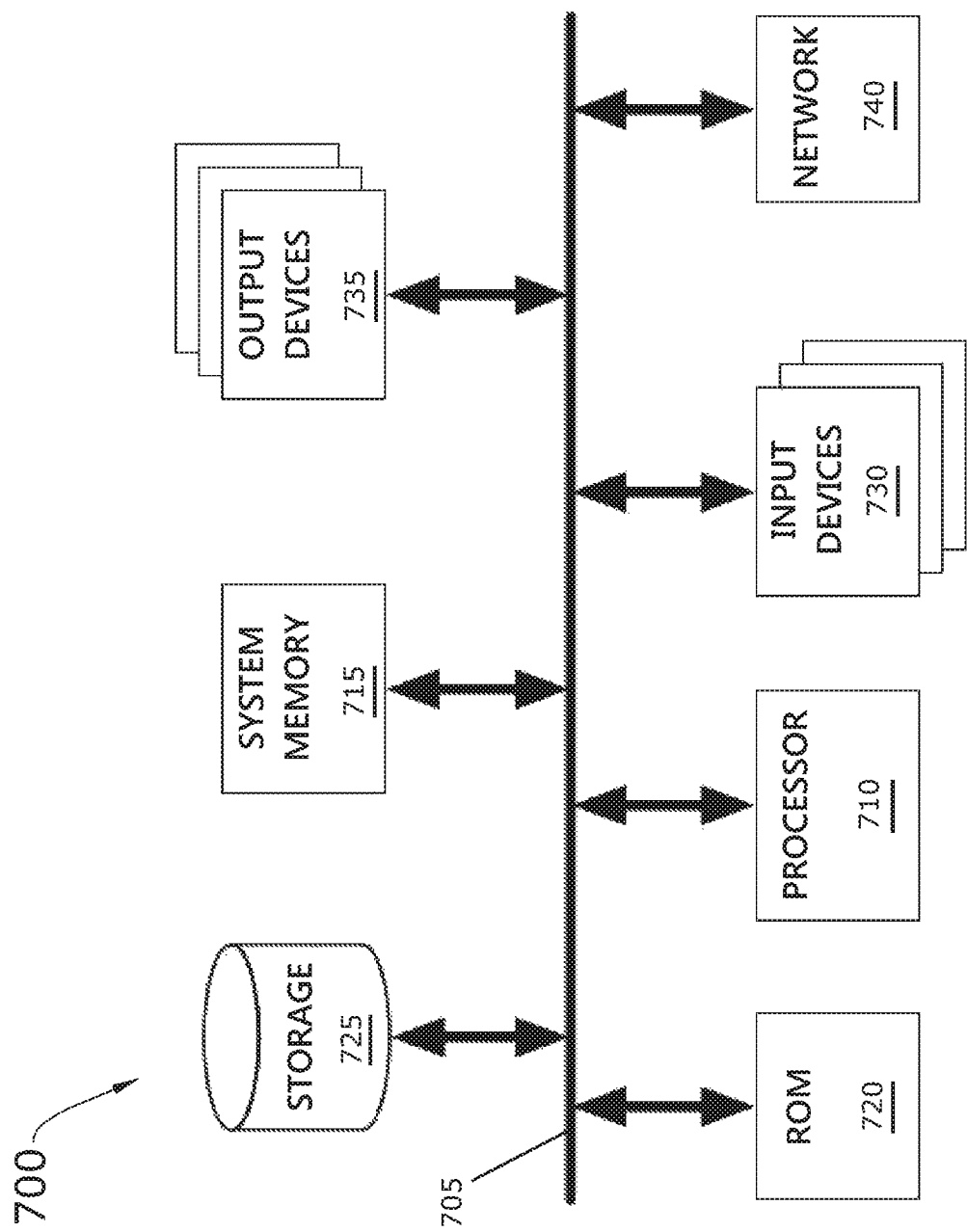
FIG. 7 conceptually illustrates an electronic system with which some embodiments of the invention are implemented.

FIG. 7 conceptually illustrates an electronic system 700 with which some embodiments of the invention are implemented. The electronic system 700 may be a computer, phone, PDA, or any other sort of electronic device. The electronic system 700 can therefore be an underlying hardware structure of a secure scanning device, such as the secure scanning device 500 described above by reference to FIG. 5. Such an electronic system, whether as a secure scanning device 500 or another device used in conjunction with an electronic driver's license and ID bracelet, such as the electronic ID bracelet 100, includes various types of computer readable media and interfaces for various other types of computer readable media. Electronic system 700 includes a bus 705, processing unit(s) 710, a system memory 715, a read-only 720, a permanent storage device 725, input devices 730, output devices 735, and a network 740.

The bus 705 collectively represents all system, peripheral, and chipset buses that communicatively connect the numerous internal devices of the electronic system 700. For instance, the bus 705 communicatively connects the processing unit(s) 710 with the read-only 720, the system memory 715, and the permanent storage device 725.

From these various memory units, the processing unit(s) 710 retrieves instructions to execute and data to process in order to execute the processes of the invention. The processing unit(s) may be a single processor or a multi-core processor in different embodiments.

The read-only-memory (ROM) 720 stores static data and instructions that are needed by the processing unit(s) 710 and other modules of the electronic system. The permanent storage device 725, on the other hand, is a read-and-write memory device. This device is a non-volatile memory unit that stores instructions and data even when the electronic system 700 is off. Some embodiments of the invention use a mass-storage device (such as a magnetic or optical disk and its corresponding disk drive) as the permanent storage device 725.

Other embodiments use a removable storage device (such as a floppy disk or a flash drive) as the permanent storage device 725. Like the permanent storage device 725, the system memory 715 is a read-and-write memory device. However, unlike storage device 725, the system memory 715 is a volatile read-and-write memory, such as a random access memory. The system memory 715 stores some of the instructions and data that the processor needs at runtime. In some embodiments, the invention's processes are stored in the system memory 715, the permanent storage device 725, and/or the read-only 720. For example, the various memory units include instructions for processing appearance alterations of displayable characters in accordance with some embodiments. From these various memory units, the processing unit(s) 710 retrieves instructions to execute and data to process in order to execute the processes of some embodiments.

The bus 705 also connects to the input and output devices 730 and 735. The input devices enable the user to communicate information and select commands to the electronic system. The input devices 730 include alphanumeric keyboards and pointing devices (also called "cursor control devices"). The output devices 735 display images generated by the electronic system 700. The output devices 735 include printers and display devices, such as cathode ray tubes (CRT) or liquid crystal displays (LCD). Some embodiments include devices such as a touchscreen that functions as both input and output devices.

Finally, as shown in FIG. 7, bus 705 also couples electronic system 700 to a network 740 through a network adapter (not shown). In this manner, the computer can be a part of a network of computers (such as a local area network ("LAN"), a wide area network ("WAN"), or an intranet), or a network of networks (such as the Internet). Any or all components of electronic system 700 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

I claim:

1. A secure scanning device to read information from an electronic driver's license and ID bracelet that stores essential user information, the secure scanning device comprising: a scan button that is configured to scan and retrieve information from an electronic driver's license and ID bracelet; a wireless data communication antenna that is configured to communicate wirelessly with the electronic driver's license and ID bracelet when the scan button is activated in the presence of the electronic driver's license and ID bracelet; an LCD touchscreen that functions as an input/output device to receive touch-based input and to visually output a display of information on the LCD touchscreen; a printed circuit board (PCB) comprising the wireless data communication antenna and an LCD display module that is configured to receive the touch-based input from the LCD touchscreen and transmit the information to the LCD touchscreen for visually output; and a chassis that embeds the wireless data communication antenna, the LCD display module, and the PCB under the LCD touchscreen, a camera that is configured to capture visual image information from the electronic driver's license and ID bracelet when the scan button is activated and a display screen of the electronic driver's license and ID bracelet is positioned with a field of view of the camera.

2. The secure scanning device of claim 1, wherein the wireless data communication antenna comprises a Bluetooth wireless device and antenna.

3. The secure scanning device of claim 1, wherein the wireless data communication antenna comprises a wireless local area network (WLAN) device and antenna.

4. The secure scanning device of claim 1, wherein the wireless data communication antenna comprises an integrated Bluetooth/wireless local area network (WLAN) device and antenna.

5. The secure scanning device of claim 1, wherein the LCD touchscreen comprises a touchscreen protective glass that is sensitive to touch of a human user and protects that LCD touchscreen.

6. The secure scanning device of claim 1 further comprising a strap clip disposed along an outer surface bezel of the chassis.

7. The secure scanning device of claim 5, wherein the strap clip is configured to secure a wrist strap that wraps around a human wrist.

* * * * *